United States Patent
Suwa (10) Patent No.: US 9,648,241 B2
(45) Date of Patent: May 9, 2017

(54) SHAKE CORRECTION DEVICE (71) Applicant: JVC KENWOOD CORPORATION, Yokohama-shi, Kanagawa (JP)

(72) Inventor: Tetsuya Suwa, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/971,776

(22) Filed: Dec. 16, 2015

(65) Prior Publication Data
US 2016/0286111 A1 Sep. 29, 2016

(30) Foreign Application Priority Data

Mar. 23, 2015 (JP) ................................. 2015-059589

(51) Int. Cl.
| | | |
|---|---|---|
| *H04N 5/228* | (2006.01) | |
| *H04N 5/232* | (2006.01) | |
| *G03B 17/56* | (2006.01) | |
| *H04N 7/18* | (2006.01) | |
| *G08B 13/196* | (2006.01) | |
| *F16M 11/28* | (2006.01) | |

(52) U.S. Cl.
CPC ........... *H04N 5/2328* (2013.01); *F16M 11/28* (2013.01); *G03B 17/561* (2013.01); *G08B 13/19617* (2013.01); *H04N 5/23258* (2013.01); *H04N 5/23274* (2013.01); *H04N 5/23287* (2013.01); *H04N 7/18* (2013.01); *G03B 2207/005* (2013.01); *H04N 7/183* (2013.01)

(58) Field of Classification Search
CPC ...... G02B 27/00; G02B 27/64; G02B 27/646; G02B 27/648; H04N 5/2328; H04N 5/23258; H04N 5/23274; H04N 5/23287; H04N 7/18; H04N 7/183; F16M 11/28; G08B 13/19617; G03B 17/56; G03B 2207/005
USPC ............................... 348/208.99, 208.1–208.6
See application file for complete search history.

(56) References Cited

U.S. PATENT DOCUMENTS

| | | | | |
|---|---|---|---|---|
| 2007/0263096 | A1* | 11/2007 | Bouzar ................... | G08G 1/04 348/208.3 |
| 2010/0110204 | A1* | 5/2010 | Campbell ............ | G02B 27/646 348/208.7 |
| 2013/0083192 | A1* | 4/2013 | Strine ...................... | G06T 7/20 348/143 |
| 2014/0037281 | A1* | 2/2014 | Carney ................ | G03B 17/561 396/421 |
| 2014/0205276 | A1* | 7/2014 | Johnston .............. | G03B 17/561 396/421 |

* cited by examiner

*Primary Examiner* — Yogesh Aggarwal
(74) *Attorney, Agent, or Firm* — Nath, Goldberg & Meyer; Jerald L. Meyer (57) ABSTRACT

A shake detection sensor detects the shaking of an imaging device attached to a telescopic pole. An extraction filter selector selects any extraction filter from a plurality of extraction filters, and extracts a signal component of a predetermined frequency band in a detection signal, which is outputted from the shake detection sensor, by the selected extraction filter. A shake corrector corrects the shaking of video captured by the imaging device, based on the signal component outputted from the extraction filter selector. An extraction filter selection controller controls the extraction filter selector to select any extraction filter among the plurality of extraction filters in response to the length of the pole.

3 Claims, 6 Drawing Sheets

SHAKE CORRECTION DEVICE

CROSS REFERENCE TO RELATED APPLICATION

This application is based upon and claims the benefit of priority under 35U.S.C.§119 from Japanese Patent Application No. 2015-039589, filed on Mar. 23, 2015, the entire contents of which are incorporated herein by reference.

BACKGROUND

The present disclosure relates to a shake correction device that corrects the shaking of video captured by an imaging device.

An imaging device frequently mounts thereon a shake correction device that corrects the shaking of the video caused by the shaking of a camera (refer to Japanese Unexamined Patent Application Publication No. 2011-138166).

SUMMARY

In order to check altitudes for structures such as a roof or a bridge, a so-called pole camera is used, in which an imaging device is attached to the tip end of a telescopic pole. Due to the influence of wind or the like, shaking is prone to occur in the video captured in comparison with a usual imaging device onto which the pole camera is not attached.

In a shake correction device mounted on the usual imaging device, it is difficult to effectively correct the shaking of video captured by the imaging device attached to the telescopic pole. The existence of a shake correction device is desired which is capable of effectively correcting the shaking of video captured by the imaging device attached to the telescopic pole.

An aspect of the embodiments provides a shake correction device including: a shake detection sensor configured to detect a shaking of an imaging device attached to a telescopic pole; an extraction filter selector configured to select any extraction filter from a plurality of extraction filters, and to extract a signal component of a predetermined frequency band in a detection signal, which is outputted from the shake detection sensor, by the selected extraction filter; a shake corrector configured to correct a shaking of video captured by the imaging device, based on the signal component outputted from the extraction filter selector; and an extraction filter selection controller configured to control the extraction filter selector to select any extraction filter among the plurality of extraction filters in response to a length of the pole.

DETAILED DESCRIPTION

A description is made below of shake correction devices of respective embodiments with reference to the accompanying drawings. First, by using FIG. 4 and FIG. 5, a description is made of a configuration example of an imaging device, which is attached to a telescopic pole, that is, a so-called pole camera.

Figure 4:
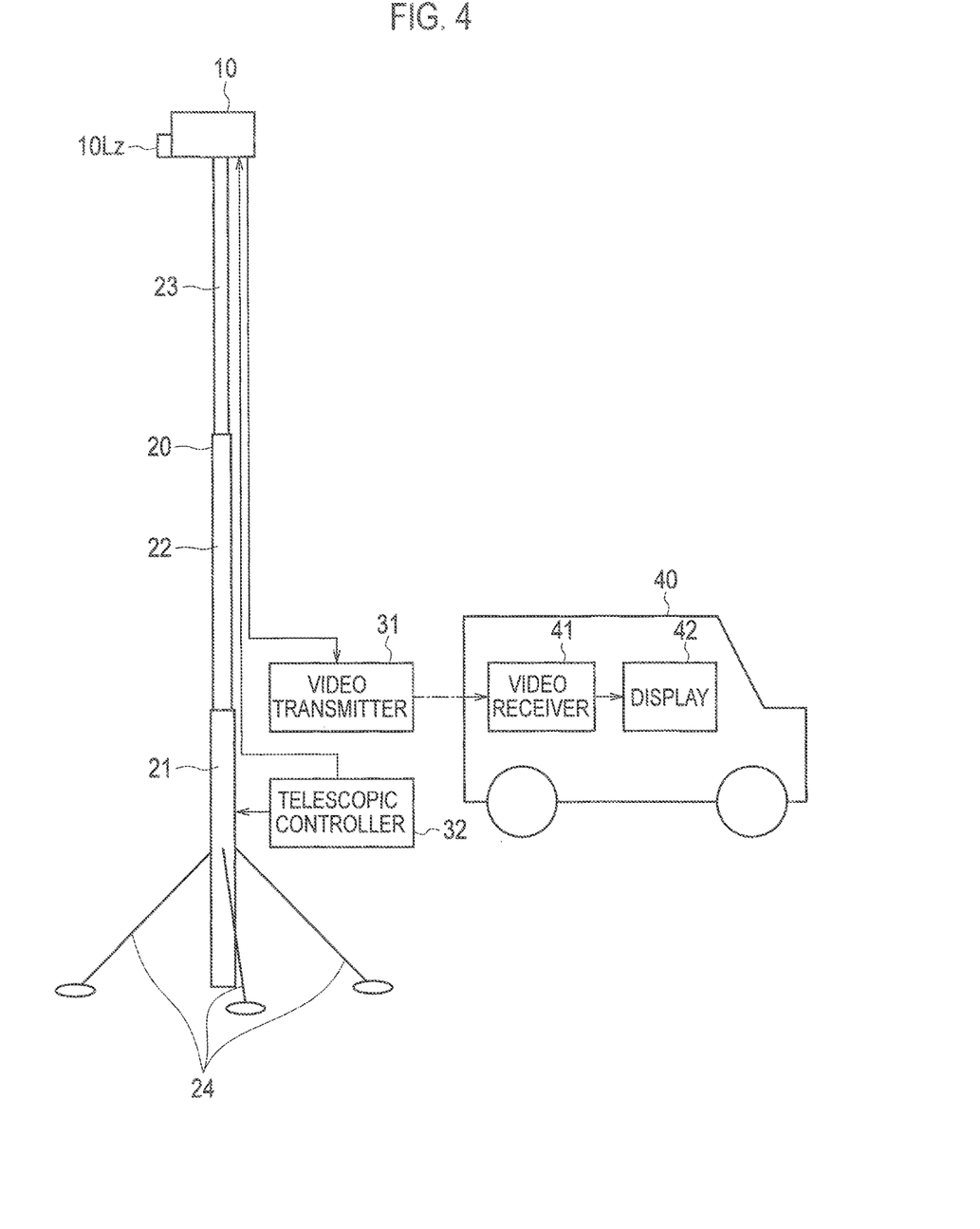
FIG. 4 is a view showing a configuration example of a pole camera.

In FIG. 4, an imaging device 10 is attached to the tip end of a telescopic pole 20. A lens 10Lz is mounted on the imaging device 10. The pole 20 includes a base portion 21, an intermediate portion 22 and a tip end portion 23. The imaging device 10 is attached to the tip end of the tip end portion 23.

The pole 20 is set in a state of being erected with respect to an installation surface by a tripod 24. The pole 20 may be held by a person.

Figures 5A, 5B:
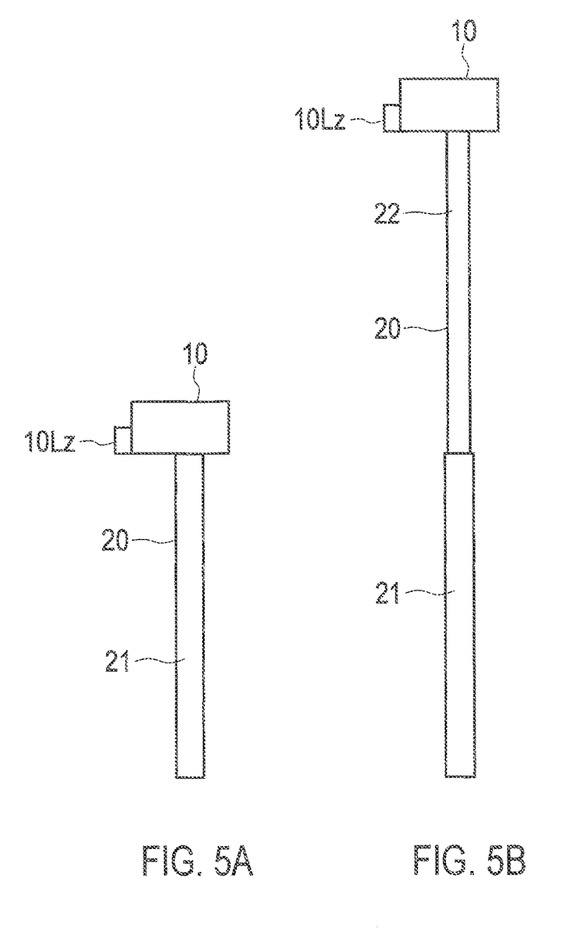
FIG. 5A is a view showing the length of the first stage in the pole camera.
FIG. 5B is a view showing the length of the second stage in the pole camera.
Figure 5C:
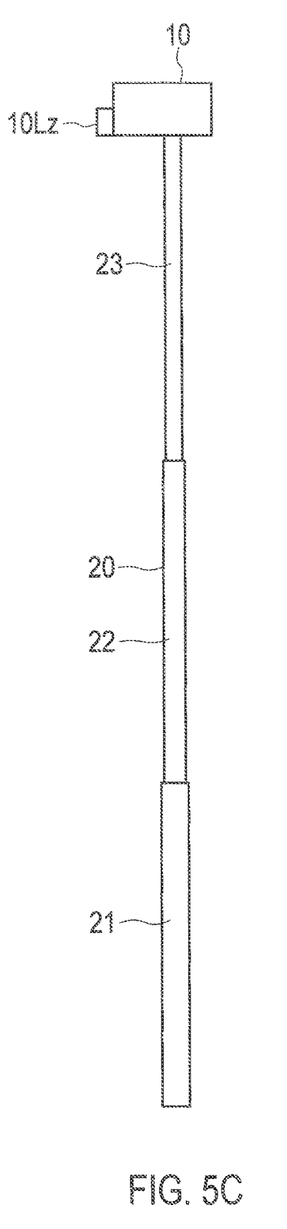
FIG. 5C is a view showing the length of the third stage in the pole camera.

As shown in FIG. 5A, the pole 20 can be set to a length of the first stage, in which the tip end portion 23 is housed in the intermediate portion 22, and the entirety of the intermediate portion 22 is housed in the base portion 21. As shown in FIG. 5B, the pole 20 can be set to the length of the second stage, in which the intermediate portion 22 is extended, and the tip end portion 23 is housed in the intermediate portion 22. As shown in FIG. 5C, the pole 20 can be set to the length of the third stage, in which the intermediate portion 22 and the tip end portion 23 are individually extended.

Here, the length of the pole 20 is set to be in three stages from the first stage to the third stage; however, an extended amount of the intermediate portion 22 or the tip end portion 23 is set to be an intermediate length, whereby such a configuration may be adopted so that the length of the pole 20 can be set to a length with a larger number of stages. In the embodiment, the length of the pole 20 is set to have three stages from the first stage to the third stage for the purpose of simplification.

Returning back to FIG. 4, such a configuration is adopted so that the length of the pole 20 can be automatically extended and contracted by a telescopic controller 32 in response to its operation by a user. A configuration in which the user manually extends and contracts the pole 20 may also be adopted. Information indicating the length of the pole 20, which is set by the telescopic controller 32, that is, information indicating to which of the lengths from the first stage to the third stage the length of the pole 20 is set is supplied to the imaging device 10.

A video signal, which is obtained in such a manner that the imaging device 10 captures a subject, is supplied to a video transmitter 31. The video transmitter 31 wirelessly transmits the video signal to a video receiver 41 provided in a vehicle 40. The video receiver 41 receives the video signal, and supplies the received video signal to a display 42 provided in the vehicle 40. The display 12 displays a video of the subject, which is indicated by the video signal.

The imaging device 10 and the video transmitter 31 are connected to each other, for example, by a network cable.

The information indicating the length of the pole 20, which is set by the telescopic controller 32, can be supplied to the imaging device 10 via the network cable.

Such a configuration may be adopted so that the information indicating the length of the pole 20, which is set by the telescopic controller 32, can be wirelessly transmitted to the imaging device 10. The video transmitter 31 and the video receiver 41 may be connected to each other by a wire. The imaging device 10 may be configured to directly transmit the video signal to the video receiver 41.

First Embodiment

Figure 1:
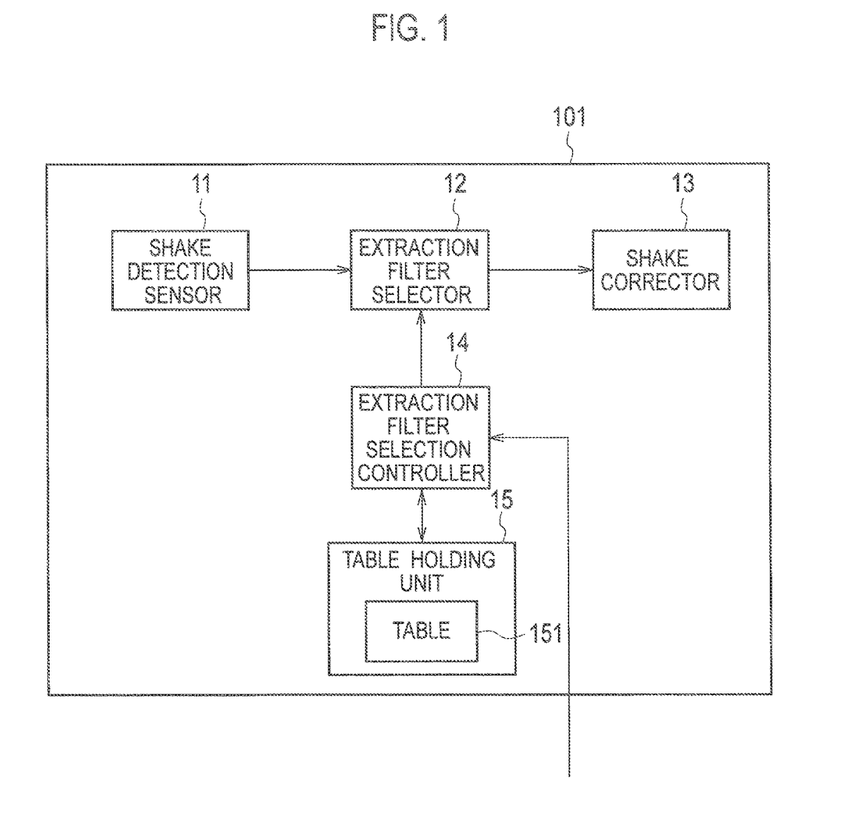
FIG. 1 is a block diagram showing a shake correction device according to the first embodiment.
Figure 2:
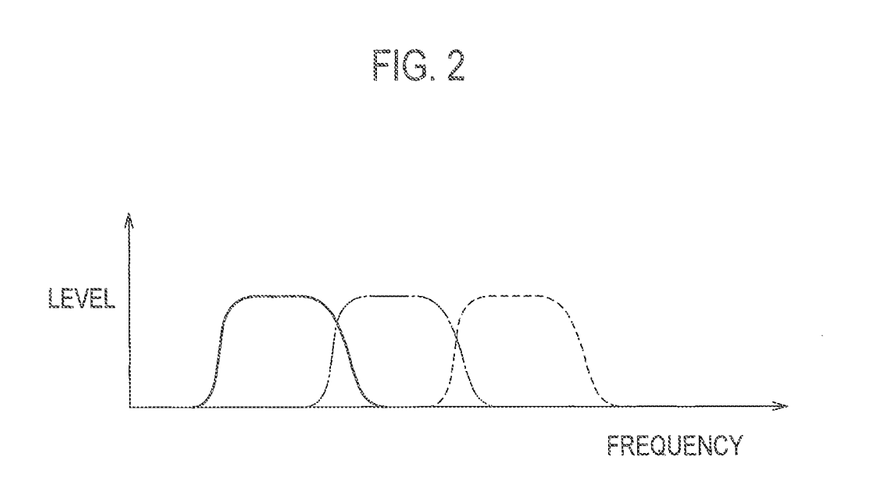
FIG. 2 is a chart showing an example of respective frequency bands of plurality of extraction filters.
Figure 3:
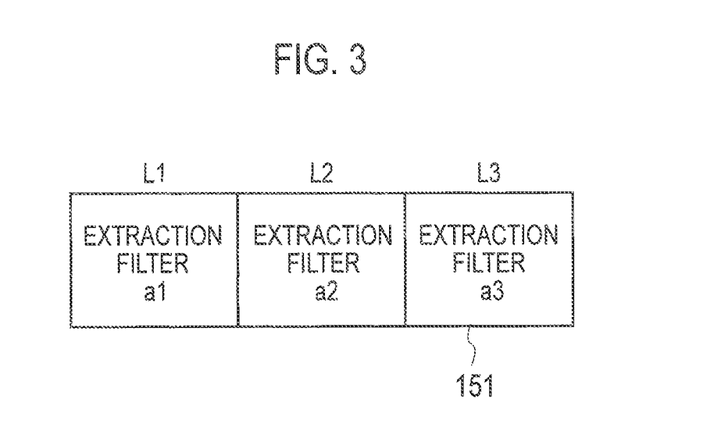
FIG. 3 is a diagram showing an example of a table for use in the shake correction device according to the first embodiment.

A description is made of a configuration and operation of a shake correction device 101 according to the first embodiment by using FIG. 1 to FIG. 3. The shake correction device 101 is mounted on the imaging device 10.

In FIG. 1, a shake detection sensor 11 detects the shake of the imaging device 10. A detection signal outputted from the shake detection sensor 11 is supplied to an extraction filter selector 12. The shake detection sensor 11 is, for example, a gyro sensor (angular velocity sensor).

The extraction filter selector 12 includes a plurality of extraction filters for extracting signal components of predetermined frequency bands in the detection signal outputted from the shake detection sensor 11. As shown in FIG. 2, the plurality of extraction filters is set so that the frequency bands in which the signal components are extracted differ from one another. Here, it is defined that the extraction filters are three; however, the extraction filter selector 12 may have a larger number of extraction filters.

The shaking frequency of the pole 20 differs depending on whether the length of the pole 20 is the first-stage length shown in FIG. 5A, the second-stage length shown in FIG. 5B, or the third-stage length shown in FIG. 5C. The shake becomes short-period when the length of the pole 20 is the first-stage length, and becomes long-period when the length of the pole 20 is the third-stage length.

Accordingly, if the pole 20 is the first-stage length, then it is recommended to extract a signal component in a frequency band shown by a broken line in FIG. 2. If the pole 20 is the second-stage length, then it is recommended to extract a signal component in a frequency band shown by a dashed-dotted line in FIG. 2. If the pole 20 is the third-stage length, then it is recommended to extract a signal component in a frequency band shown by a solid line in FIG. 2.

In FIG. 2, bandwidths of the respective frequency bands are equalized to one another; however, the bandwidths may be allowed to differ from one another so that the signal component of the short-period shake and the signal component of the long-period shake can be individually extracted with accuracy.

The extraction filter selector 12 selects any extraction filter from the plurality of extraction filters, and by the selected extraction filter, extracts the signal component of the predetermined frequency band in the detection signal outputted from the shake detection sensor 11. An extraction filter selection controller 14 controls which of the extraction filters the extraction filter selector 12 selects.

A shake corrector 13 corrects the shaking of video, captured by the imaging device 10, based on the signal component outputted from the extraction filter selector 12. The shake corrector 13 is an arbitrary correction unit that corrects the shaking of the video.

The shake corrector 13 may correct the shaking of the video by moving an optical component such as a lens, or may correct the shaking of the video by moving the imaging element. Moreover, the shake corrector 13 may correct the shake of the video by moving the pixel range in which the video signal is read from the imaging element.

The shake corrector 13 needs to move the optical component or the imaging element, or move the pixel range of the imaging element so that the direction of the shaking detected by the shake detection sensor 11 can be canceled.

The information indicating the length of the pole 20, which is set by the telescopic controller 32, is inputted to the extraction filter selection control unit 14. In a case where the configuration in which the user manually extends and contracts the pole 20 is adopted, the information on the length of the pole 20 needs to be inputted to the extraction filter selection controller 14 by an operation unit (not shown).

As shown in FIG. 3, a table holding unit 15 stores a table 151 in which the following information is set. The information indicates that an extraction filter a1 should be selected so as to correspond to L1 in which the length of the pole 20 is the first-stage length, that an extraction filter a2 should be selected so as to correspond to L2 in which the length of the pole 20 is the second-stage length, and that an extraction filter a3 should be selected so as to correspond to L3 in which the length of the pole 20 is the third-stage length.

The extraction filter a1 is an extraction filter that extracts the signal component in the frequency band shown by the solid line in FIG. 2. The extraction filter a2 is an extraction filter that extracts the signal component in the frequency band shown by the dashed-dotted line in FIG. 2. The extraction filter a3 is an extraction filter that extracts the signal component in the frequency band shown by the broken line in FIG. 2.

The extraction filter selection controller 14 refers to the table 151, and controls the extraction filter selector 12 to select any extraction filter among the plurality of extraction filters a1 to a3 in response to the length of the pole 20 on which the imaging device 10 is mounted.

According to the shake correction device 101 according to the first embodiment, the shaking of video captured by the imaging device 10 attached to the telescopic pole 20 can be corrected effectively.

Second Embodiment

Figure 6:
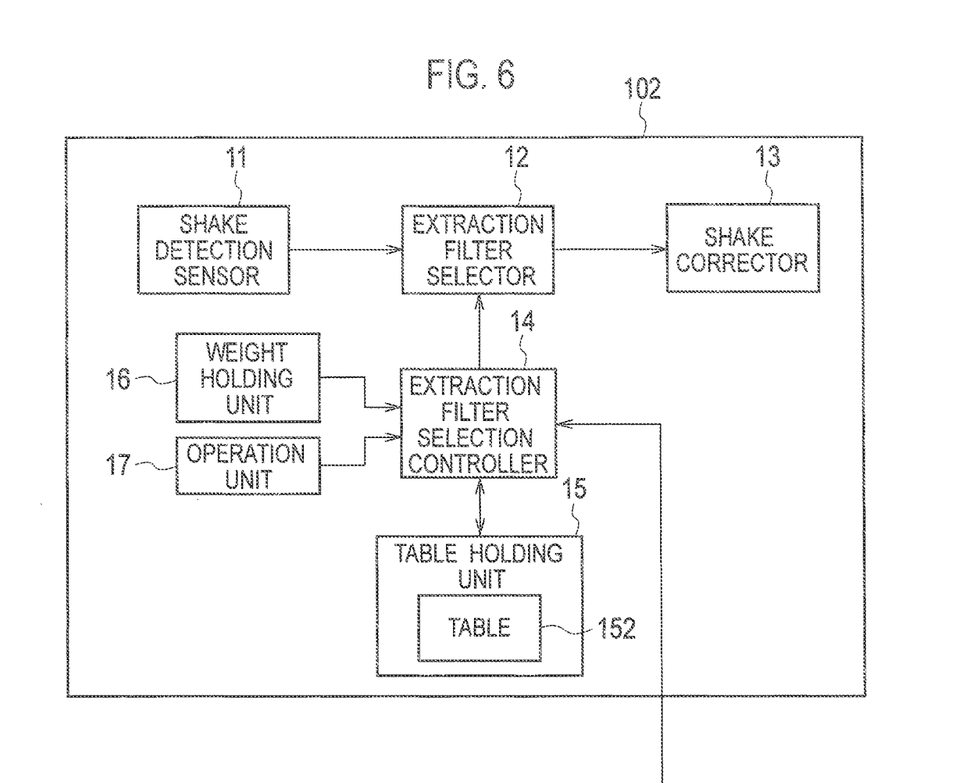
FIG. 6 is a block diagram showing a shake correction device according to the second embodiment.
Figure 7:
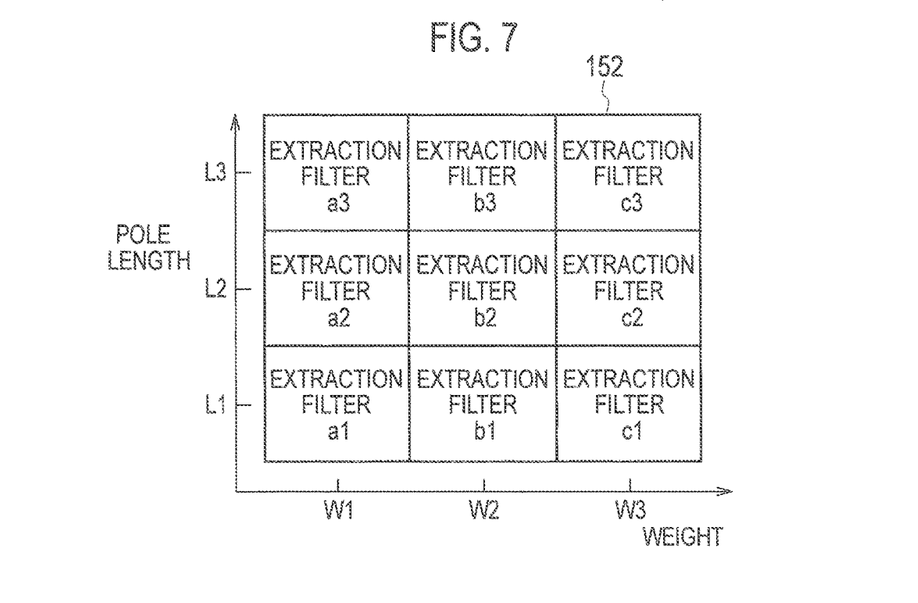
FIG. 7 is a diagram showing an example of a table for use in the shake correction device according to the second embodiment.

A description is made of a configuration and operation of a shake correction device 102 according to the second embodiment by using FIG. 6 and FIG. 7. The shake correction device 102 is mounted on the imaging device 10. In the shake correction device 102 according to the second embodiment, which is shown in FIG. 6, the same reference numerals are assigned to the same portions as those of the shake correction device 101 according to the first embodiment, which is shown in FIG. 1, and a description is sometimes omitted.

Strictly speaking, the shaking frequency of the pole 20 is anted by the weight of the imaging device 10. The shake correction device 102 according to the second embodiment is configured so that the extraction filter selector 12 selects an optimum extraction filter in consideration of the weight of the imaging device 10 and the length of the pole 20.

In FIG. 6, a weight holding unit 16 holds information indicating the weight of the imaging device 10. Here, the weight of the imaging device 10 is a weight when the imaging device 10 mounts the standard lens 10Lz. When the lens 10Lz is replaced by another lens, the weight of the imaging device 10 is changed. In a case of driving the imaging device 10 with a battery, the weight of the imaging device 10 is also changed in accordance with the weight of the battery.

In a case of having replaced the lens 10Lz with another lens, then by an operation unit 17, the user inputs that the lens 10Lz is replaced by another lens. If the extraction filter selection controller 14 stores a difference between the lens 10Lz and the other lens in advance, then the weight of the imaging device 10 when the lens 10Lz is replaced by the other lens can be obtained.

By the operation unit 17, the user may input the weight of the imaging device 10 in a state when the lens 10Lz is replaced by the other lens.

Also in a case where the weight of the imaging device 10 is changed due to the replacement of the battery or other reasons, then in a similar way, the extraction filter selection controller 14 needs to select the weight of the imaging device 10, or to input the weight of the imaging device 10 with the operation unit 17.

In a case of the configuration in which the user manually extends and contracts the pole 20, the length of the pole 20 needs to be inputted by the operation unit 17.

As shown in FIG. 7, the table holding unit 15 stores a table 152 in which the following information is set. The information indicates which extraction filter should be selected in each of cases where the length of the pole 20 is L1 to L3 for each of cases where the weight of the imaging device 10 is W1, W2 and W3.

Here, the weight is classified into three types which are W1 to W3; however, the number of classified weights may be two, or four or more.

In the table 152, information is set, indicating that, when the weight of the imaging device 10 is W1, the extraction filter a1 should be selected so as to correspond to the length L1 of the pole 20, the extraction filter a2 should be selected so as to correspond to the length L2 thereof, and the extraction filter a3 should be selected so as to correspond to the length L3 thereof.

In the table 152, information is set, indicating that, when the weight of the imaging device 10 is W2, an extraction filter b1 should be selected so as to correspond to the length L1 of the pole 20, an extraction filter b2 should be selected so as to correspond to the length L2, and an extraction filter b3 should be selected so as to correspond to the length L3.

In the table 152, information is set, indicating that, when the weight of the imaging device 10 is W3, an extraction filter c1 should be selected so as to correspond to the length L1 of the pole 20, an extraction filter c2 should be selected so as to correspond to the length L2, and an extraction filter c3 should be selected so as to correspond to the length L3.

The extraction filter selector 12 includes the extraction filters a1 to a3, b1 to b3 and c1 to c3.

The extraction filter selection controller 14 controls the extraction filter selector 12 to select any extraction filter among the plurality of extraction filters a1 to a3, b1 to b3 and c1 to c3 in response to combinations of the weight of the imaging device 10 and the length of the pole 20.

Regarding the shake correction device 102 according to the second embodiment, the configuration is adopted so that the extraction filter can be determined in consideration of not only the length of the pole 20 but also the weight of the imaging device 10, and accordingly, the shake of the video captured by the imaging device 10 attached to the telescopic pole 20 can be corrected more effectively.

Third Embodiment

Figure 8:
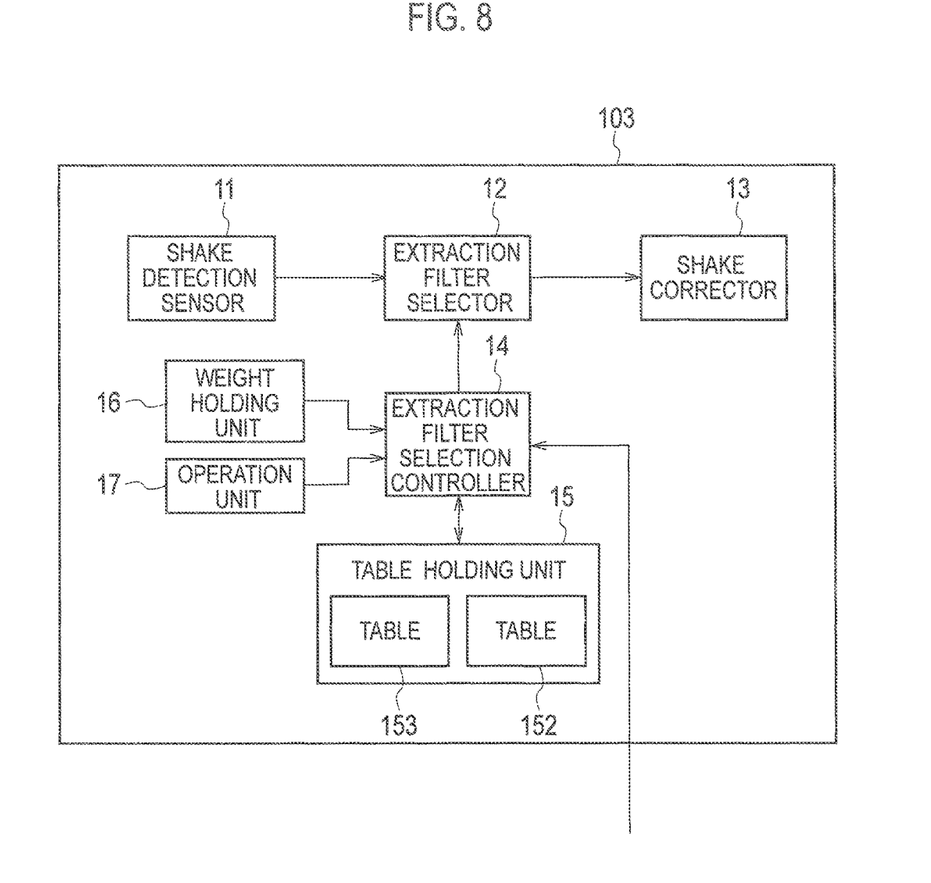
FIG. 8 is a block diagram showing a shake correction device according to the third embodiment.

A description is made of a configuration and operation of a shake correction device 103 according to the third embodiment by using FIG. 8. The shake correction device 103 is mounted on the imaging device 10. In the shake correction device 103 according to the third embodiment, which is shown in FIG. 8, the same reference numerals are assigned to the same portions as those of the shake correction device 102 of the second embodiment, which is shown in FIG. 6, and a description is sometimes omitted.

Strictly speaking, the shaking frequency of the pole 20 is affected by the rigidity of the pole 20. A table holding unit 15 in the shake correction device 103 according to the third embodiment includes, for example, two tables 152 and 153, so as to correspond to poles 20 difference in rigidity.

The table holding unit 15 may include three or more tables corresponding to three or more types of the poles 20 difference in rigidity.

The table 152 may be set so as to correspond to a pole 20 having the first rigidity, and the table 153 may be set so as to correspond to a pole 20 having the second rigidity, which is made by the same manufacturer as that of the pole 20 having the first rigidity. Moreover, the table 152 may be set so as to correspond to a pole 20 having the first rigidity, which is made by the first manufacturer, and the table 153 may be set so as to correspond to a pole 20 having the second rigidity, which is made by the second manufacturer.

By the operation unit 17, the user inputs which of the poles 20 are now in use; the first rigidity or the second rigidity. In such a way, the extraction filter selection controller 14 can control the extraction filter selector 12 to select the table 152 or 153, which corresponds to the pole 20 now in use, and to select the optimum extraction filter.

In the shake correction device 103 according to the third embodiment, the table holding unit 15 is configured to include the table 152 shown in FIG. 7 and the table 153 similar to the table 152. The shake correction device 103 may be configured to include a plurality of tables for selecting the extraction filter in response to only the length of the pole 20, each table being as shown in FIG. 3, so as to correspond to the rigidity of the pole 20.

The configurations of the first to third embodiments and a mechanical damper that suppresses the shaking may be combined. The damper may be-controlled electrically by the detection signal outputted from the shake detection sensor 11.

In a case where the imaging device 10 has a PTZ function (Pan/Tilt/Zoom), a configuration may be adopted so that, at a time of a PTZ operation, the selection operation for the extraction filter by the extraction filter selector 12 is turned off, and a default extraction filter is used.

The extraction filter selection controller 14 may be configured to select the extraction filter, which is included in the extraction filter selector 12, one by one for each length of the pole 20, and to write the extraction filter, from which the maximum signal component is obtained, into the tables 151 to 153.

In the first to third embodiments, the tables 151 to 153 are used; however, such a configuration may be adopted so that the extraction filter to be selected can be determined by an arithmetic operation in response to conditions including the length of the pole 20, the weight of the imaging device 10 and the rigidity of the pole 20.

The present invention is not limited to the first to third embodiments described above, and is changeable in various ways within the scope without departing from the scope of the present invention. In an event of configuring the first to third embodiments, the use of hardware or software is optional.

What is claimed is:

1. A shake correction device comprising:
   a shake detection sensor configured to detect a shaking of an imaging device attached to a telescopic pole;
   an extraction filter selector configured to select any extraction filter from a plurality of extraction filters, and to extract a signal component of a predetermined frequency band in a detection signal by the selected extraction filter, the detection signal being outputted from the shake detection sensor;
   a shake corrector configured to correct a shaking of video based on the signal component outputted from the extraction filter selector, the video being captured by the imaging device; and
   an extraction filter selection controller configured to control the extraction filter selector to select any extraction filter among the plurality of extraction filters in response to a length the pole.

2. The shake correction device according to claim 1, wherein the extraction filter selection controller controls the extraction filter selector to select any extraction filter among the plurality of extraction filters in response to a combination of a weight of the imaging device and the length of the pole.

3. The shake correction device according to claim 1, further comprising a table holding unit configured to store a table in which information indicating which extraction filter among the plurality of extraction filters is to be selected in response to the length of the pole that is set,
   wherein the table holding unit individually stores tables so as to correspond to different rigidities of the pole, and
   the extraction filter selection controller controls the extraction filter selector to select a table corresponding to the rigidity of the pole, and to select the extraction filter based on the selected table.

* * * * *

UNITED STATES PATENT AND TRADEMARK OFFICE
CERTIFICATE OF CORRECTION

PATENT NO. : 9,648,241 B2
APPLICATION NO. : 14/971776
DATED : May 9, 2017
INVENTOR(S) : Tetsuya Suwa It is certified that error appears in the above-identified patent and that said Letters Patent is hereby corrected as shown below:

In the Claims

Claim 1, Column 7, Line 19, please insert the word --of-- between "to a length" and "the pole".

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*